United States Patent
Nagasawa et al.

(10) Patent No.: US 7,479,533 B2
(45) Date of Patent: *Jan. 20, 2009

(54) GOLF BALL

(75) Inventors: Hiroyuki Nagasawa, Chichibu (JP); Yoshinori Egashira, Chichibu (JP); Yoshihiro Yamana, Tokyo (JP); Hidekazu Saito, Kurashiki (JP); Hiroki Kimura, Kurashiki (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 118 days.

This patent is subject to a terminal disclaimer.

(21) Appl. No.: 11/120,959

(22) Filed: May 4, 2005

(65) Prior Publication Data

US 2006/0252578 A1    Nov. 9, 2006

(51) Int. Cl.
    *A63B 37/12*    (2006.01)
(52) U.S. Cl. .............................. 528/76; 528/65; 528/66; 473/378
(58) Field of Classification Search .................. None
    See application file for complete search history.

(56) References Cited

U.S. PATENT DOCUMENTS

| | | | |
|---|---|---|---|
| 3,395,109 A | 7/1968 | Molitor et al. | |
| 4,248,432 A | 2/1981 | Hewitt et al. | |
| 4,347,338 A | 8/1982 | Torii et al. | |
| 4,442,282 A | 4/1984 | Kolycheck | |
| 5,006,297 A | 4/1991 | Brown et al. | |
| 5,334,673 A | 8/1994 | Wu | |
| 5,733,428 A | 3/1998 | Calabria et al. | |
| 5,888,437 A | 3/1999 | Calabria et al. | |
| 5,897,884 A | 4/1999 | Calabria et al. | |
| 5,929,189 A | 7/1999 | Ichikawa et al. | |
| 5,947,843 A | 9/1999 | Calabria et al. | |
| 6,117,024 A | 9/2000 | Dewanjee | |
| 6,123,628 A | 9/2000 | Ichikawa et al. | |
| 6,190,268 B1 | 2/2001 | Dewanjee | |
| 6,582,325 B1 | 6/2003 | Ichikawa et al. | |
| 6,747,100 B2 | 6/2004 | Ichikawa et al. | |
| 6,806,323 B2 | 10/2004 | Ichikawa et al. | |
| 7,278,929 B2 * | 10/2007 | Umezawa et al. | 473/373 |
| 2003/0073515 A1 * | 4/2003 | Yokota | 473/378 |
| 2003/0199643 A1 * | 10/2003 | Iwami | 525/440 |
| 2005/0049082 A1 * | 3/2005 | Tzivanis et al. | 473/378 |
| 2005/0079351 A1 * | 4/2005 | Isogawa et al. | 428/402 |
| 2006/0094538 A1 * | 5/2006 | Kennedy et al. | 473/371 |
| 2006/0249880 A1 * | 11/2006 | Nagasawa et al. | 264/279.1 |
| 2006/0252579 A1 * | 11/2006 | Umezawa et al. | 473/371 |
| 2007/0073031 A1 * | 3/2007 | Nagasawa et al. | 528/85 |

FOREIGN PATENT DOCUMENTS

| | | |
|---|---|---|
| JP | 58-2063 B2 | 1/1983 |
| JP | 9-271538 A | 10/1997 |
| JP | 11-178949 A | 7/1999 |
| JP | 2002-336378 A | 11/2002 |
| JP | 2002-336380 A | 11/2002 |

\* cited by examiner

*Primary Examiner*—David Buttner
(74) *Attorney, Agent, or Firm*—Sughrue Mion, PLLC

(57) ABSTRACT

A golf ball composed of a core and one or more cover layer which encloses the core is characterized in that at least one cover layer is made of a thermoplastic polyurethane composition characterized by including at least 90 wt % of a thermoplastic polyurethane obtained by a polyurethane-forming reaction of an organic diisocyanate compound with a long-chain polyol and a chain extender, and in that the polyurethane composition cover layer is characterized that an inherent viscosity in a DMF solvent is larger than 1.5 dl/g and an inherent viscosity in a DMF solution containing 0.05 mol/L n-butylamine is larger than 0.5 dl/g. The golf ball has a high rebound, an excellent scuff resistance, is recyclable in a molding operation, and has excellent manufacturability.

12 Claims, No Drawings

GOLF BALL

BACKGROUND OF THE INVENTION

The present invention relates to a golf ball in which a specific thermoplastic polyurethane composition is used in the cover. More specifically, the invention relates to a golf ball in which a thermoplastic polyurethane composition that is recyclable in a molding operation is used in the cover, which golf ball has a high rebound, excellent spin characteristics and scuff resistance, and an excellent manufacturability.

The use of polyurethane materials as golf ball cover materials has been receiving some attention in recent years. Polyurethane materials are broadly divided, based on the process used to make molded articles, into thermoset polyurethane materials and thermoplastic polyurethane materials. Molded articles made of thermoset polyurethane materials can be obtained by mixing under applied heat a urethane prepolymer having isocyanate end groups with a liquid starting material such as a polyol or a polyamine as the curing agent, then pouring the mixture directly into a mold and heating to effect a urethane curing reaction.

Numerous golf balls which use such a thermoset polyurethane material have been disclosed in the prior art (e.g., Patent Reference 1: U.S. Pat. No. 5,334,673, Patent Reference 2: U.S. Pat. No. 6,117,024, and Patent Reference 3: U.S. Pat. No. 6,190,268). Methods of molding thermoset polyurethane materials are described in, for example, Patent Reference 4: U.S. Pat. No. 5,006,297, Patent Reference 5: U.S. Pat. No. 5,733, 428, Patent Reference 6: U.S. Pat. No. 5,888,437, Patent Reference 7: U.S. Pat. No. 5,897,884, and Patent Reference 8: U.S. Pat. No. 5,947,843.

Because moldings made of thermoset polyurethane materials lack plasticity when heated, the starting materials and molded articles cannot be recycled. Moreover, given the length of the heating and curing step and of the cooling step and given the difficulty of controlling the molding time owing to the high reactivity under heating and the instability of the starting materials, molded articles made of thermoset polyurethane materials have a manufacturability, for use as special moldings such as golf ball covers (moldings which enclose a core material), that is regarded as inefficient.

By contrast, moldings made of thermoplastic polyurethane materials are not obtained by directly reacting the starting materials. Instead, a linear polyurethane material synthesized using starting materials and a production method which differ somewhat from those for the thermoset polyurethane materials described above is employed in the molding operation. Such a polyurethane material is thermoplastic, and the thermoplasticized polyurethane material has the quality of solidifying when cooled. Such polyurethane materials can thus be molded using an injection molding machine. The injection molding of thermoplastic polyurethane materials has a molding time which is much shorter than the molding time for thermoset polyurethane materials and moreover is suitable for precision molding, making it ideal as a process for molding golf ball covers. In addition, thermoplastic polyurethane materials are recyclable, and are friendly to the global environment. Golf balls made using thermoplastic polyurethane materials are disclosed in, for example, Patent Reference 9: U.S. Pat. No. 3,395,109, Patent Reference 10: U.S. Pat. No. 4,248,432 and Patent Reference 11: U.S. Pat. No. 4,442,282.

However, prior-art golf ball covers made with thermoplastic polyurethane materials have been unable to satisfy at the same time requirements for feel on impact, controllability, rebound and scuff resistance when hit with an iron.

To address this need, Patent Reference 12: JP-A 9-271538 discloses a golf ball cover made using a high-resilience thermoplastic polyurethane material. Yet, even this golf ball cover falls short in terms of its scuff resistance when hit with an iron.

Patent Reference 13: JP-A 11-178949 describes a golf ball cover which has a relatively good scuff resistance when hit with an iron and is composed primarily of the reaction product of a thermoplastic polyurethane material with an isocyanate compound. In this cover, an isocyanate compound such as a diisocyanate or a block isocyanate dimer is added as an additive to the thermoplastic polyurethane material. Addition is carried out during melt mixing under applied heat using an extruder or during injection molding, with the reaction being effected during molding.

However, in the molding of a cover according to JP-A 11-178949 above, the isocyanate compound is hard to handle because it loses its activity in the presence of moisture, thus making it difficult to obtain a stable reaction product. In the case of blocked isocyanates, which are highly resistant to moisture absorption, the blocking agent that dissociates under heating has a strong odor, making it unsuitable for use in molding covers. Moreover, when the isocyanate compound is in the form of a powder or a solution, it is difficult to control the amount of addition to the thermoplastic polyurethane material, making control of the golf ball cover properties a challenge. Furthermore, owing to melting point and melt viscosity differences between the thermoplastic polyurethane material and the isocyanate compound, slippage arises within the molding machine, which sometimes makes thorough kneading impossible to achieve. In this prior art, for the reasons given above, control of the effects of moisture within the cover material and of the amount of additive included therein has been inadequate, making it impossible to achieve golf ball covers which are fully satisfactory in terms of their scuff resistance-improving effects.

The preferred thermoplastic polyurethane material described in JP-A 11-178949 is based on an aliphatic isocyanate. However, this thermoplastic polyurethane material has a very large reactivity with isocyanate, making the reaction difficult to control. As a result, one problem is that gelation tends to arise before the mixture is used in injection molding, making it impossible to ensure sufficient plasticity. Another problem is that gelation sometimes occurs during the molding operation. Yet another problem is that the resin to be recycled sometimes gels, as a result of which it cannot be reclaimed. These problems have made it difficult to put the above technology to practical use.

Patent Reference 14: JP-B 58-2063 (U.S. Pat. No. 4,347, 338) describes a method of manufacturing thermoset polyurethane molded articles which involves intimately mixing a compound bearing two or more isocyanate groups with a thermoplastic resin which does not react with isocyanate groups, blending the resulting mixture with a thermoplastic polyurethane material, then furnishing the blend to a molding machine and molding. However, the objects of this prior art are simply to improve the resistance to solvents and to continuous and repeated friction; the published specification makes no mention of the use of this prior-art molding material as a golf ball cover material. Accordingly, there continues to exist a desire for a golf ball cover material which can satisfy a number of properties required of golf balls; i.e., rebound, distance, spin characteristics, controllability, feel on impact, scuff resistance, cut resistance, and discoloration resistance.

Patent Reference 15: JP-A 2002-336378 discloses a golf ball which uses a cover material composed of a thermoplastic polyurethane material and an isocyanate mixture. This cover material is a thermoplastic polyurethane material which is recyclable, has a high rebound, and has an excellent scuff resistance. Although such a cover material has both a good thermoplastic polyurethane manufacturability and exhibits physical properties comparable with those of thermoset polyurethanes, it also have a number of drawbacks, including the formation of scorched material when the isocyanate mixture is charged into the molding machine and poor molding stability.

In addition, Patent Reference 16: JP-A 2002-336380 describes a golf ball wherein a material obtained by blending a thermoplastic polyurethane material which contains as the polymeric polyol a polyether polyol having an average molecular weight of at least 1500 and which has a rebound resilience of at least 40% with a specific isocyanate mixture is used as the cover material. However, this cover material has the same drawbacks as those associated with the art disclosed in aforementioned Patent Reference 15; namely, the formation of scorched material when the cover material is charged into the molding machine, and poor molding stability.

SUMMARY OF THE INVENTION

It is thus an object of this invention to provide a golf ball which has a high rebound, excellent spin characteristics and scuff resistance, is recyclable in a molding operation, and has excellent manufacturability.

We have found that the above-described problems can be resolved by a golf ball which is composed of a core and one or more cover layer that encloses the core, and which is characterized in that at least one cover layer is made of a thermoplastic polyurethane composition that includes at least 90 wt % of a thermoplastic polyurethane obtained by a polyurethane-forming reaction between a long-chain polyol, an organic diisocyanate compound and a chain extender, and in that the polyurethane composition cover layer is made of a thermoplastic polyurethane characterized by having an inherent viscosity in a DMF solvent of at least 1.5 dl/g and an inherent viscosity in a DMF solution containing 0.05 mol/L n-butylamine of at least 0.5 dl/g.

Accordingly, the invention provides the following golf balls.

(1) A golf ball composed of a core and one or more cover layer which encloses the core, the golf ball being characterized in that at least one cover layer is made of a thermoplastic polyurethane composition characterized by including at least 90 wt % of a thermoplastic polyurethane obtained by a polyurethane-forming reaction of an organic diisocyanate compound with a long-chain polyol and a chain extender, and in that the polyurethane composition cover layer is characterized that an inherent viscosity in a DMF solvent is larger than 1.5 dl/g and an inherent viscosity in a DMF solution containing 0.05 mol/L n-butylamine is larger than 0.5 dl/g.

(2) The golf ball of (1) above which is characterized in that the long-chain polyol is a polyether polyol having a number-average molecular weight of 1,500 to 5,000.

(3) The golf ball of (1) above, wherein the inherent viscosity of the cover in DMF is larger than the inherent viscosity in DMF of the thermoplastic polyurethane composition prior to molding, and the inherent viscosity of the cover in 0.05 mol/L n-butylamine-containing DMF solution is larger than the inherent viscosity in 0.05 mol/L n-butylamine-containing DMF solution of the thermoplastic polyurethane composition prior to molding.

(4) The golf ball of (1) above which is characterized in that the thermoplastic polyurethane making up the cover layer has a content of nitrogen atoms originating from the organic diisocyanate compound, expressed as a percentage of the weight of the long-chain polyol, the organic diisocyanate compound and the chain extender combined, within a range of 4.0 to 6.5 wt %.

(5) The golf ball of (1) above, wherein the cover layer made of the thermoplastic polyurethane composition has a surface hardness, expressed as the durometer D hardness, of 40 to 80 and a rebound resilience of at least 45%.

(6) The golf ball of (1) above, wherein the cover layer made of the thermoplastic polyurethane composition is formed by covering the core with the thermoplastic polyurethane composition, then heat treating at a temperature of at least 50° C.

(7) The golf ball of (1) above, wherein the thermoplastic polyurethane composition is recyclable in a molding operation.

DETAILED DESCRIPTION OF THE INVENTION

The invention is described more fully below.

The golf ball of the invention is composed of a core and one or more cover layer which encloses the core, and is characterized in that at least one cover layer is made of a thermoplastic polyurethane composition (sometimes referred to hereinafter as simply "cover material") characterized by including at least 90 wt % of a thermoplastic polyurethane obtained by a polyurethane-forming reaction among a long-chain polyol, an organic diisocyanate compound and a chain extender, and an inherent viscosity in a DMF solvent of a cover layer is larger than 1.5 dl/g and an inherent viscosity in a DMF solution containing 0.05 mol/L n-butylamine is larger than 0.5 dl/g. Golf balls composed of such a thermoplastic polyurethane have an excellent rebound, spin characteristics and scuff resistance.

The inherent viscosity of the thermoplastic polyurethane in a DMF solvent is preferably at least 1.7 dl/g, more preferably at least 1.9 dl/g, and even more preferably at least about 2 dl/g, at which point the thermoplastic polyurethane becomes substantially insoluble in the DMF solvent.

The inherent viscosity of the thermoplastic polyurethane in a 0.05 mol/L n-butylamine-containing DMF solution is preferably at least 0.6 dl/g, more preferably 0.7 to 2.0 dl/g, and even more preferably 0.8 to 1.5 dl/g.

The "inherent viscosity of the thermoplastic polyurethane in a DMF solvent" used in this specification is computed based on flow time measured at 30° C. for a DMF solvent of the thermoplastic polyurethane that has been prepared to a concentration of 0.5 g/dl. Likewise, the "inherent viscosity in a DMF solution containing 0.05 mol/L n-butylamine" is computed based on the flow time measured at 30° C. for a 0.05 mol/L n-butylamine-containing DMF solution of the thermoplastic polyurethane that has been prepared to a concentration of 0.5 g/dl. These values are measured by the methods described subsequently in the "Examples" section.

The thermoplastic polyurethane is included as a major component in the thermoplastic polyurethane composition used in the cover of the inventive golf ball. Here, "major component" signifies that the thermoplastic polyurethane accounts for at least 90 wt %, preferably at least 95 wt %, more preferably at least 99 wt %, and up to 100 wt %, of the thermoplastic polyurethane composition.

In addition to the above thermoplastic polyurethane, the thermoplastic polyurethane composition may also include other ingredients. Examples of such other ingredients include thermoplastic polymers other than thermoplastic polyurethane, such as polyester elastomers, polyamide elastomers, ionomer resins, styrene block elastomers, polyethylene and nylon resins. The amount in which such thermoplastic polymers other than thermoplastic polyurethane are included, per 100 parts by weight of the thermoplastic polyurethane serving as the essential component therein, is generally 0 to 10 parts by weight, preferably 0 to 5 parts by weight, and more preferably 0 to 1 part by weight. This amount may be selected as appropriate for such purposes as adjusting the hardness of the cover layer material, improving the resilience, enhancing the flow properties, and improving the adhesion of the cover material.

If necessary, the cover material may include also various additives other than the ingredients making up the above thermoplastic polyurethane. For example, additives such as pigments, dispersants, antioxidants, light stabilizers, ultraviolet absorbers and parting agents may be suitably included.

It is desirable for the thermoplastic polyurethane to have a structure which includes soft segments made of a polymeric polyol that is a long-chain polyol (polymeric glycol), and hard segments made of a chain extender and an organic diisocyanate. Here, the long-chain polyol used as a starting material is not subject to any particular limitation, and may be any that has been used in the prior art relating to thermoplastic polyurethanes. Exemplary long-chain polyols include polyester polyols, polyether polyols, polycarbonate polyols, polyester polycarbonate polyols, polyolefin polyols, conjugated diene polymer-based polyols, castor oil-based polyols, silicone-based polyols and vinyl polymer-based polyols. These long-chain polyols may be used singly or as combinations of two or more thereof. Of the long-chain polyols mentioned here, polyether polyols are preferred because they enable the synthesis of thermoplastic polyurethanes having a high rebound resilience and excellent low-temperature properties.

Illustrative examples of the above polyether polyol include poly(ethylene glycol), poly(propylene glycol), poly(tetramethylene glycol) and poly(methyltetramethylene glycol) obtained by the ring-opening polymerization of a cyclic ether. The polyether polyol may be used singly or as a combination of two or more thereof. Of these, poly(tetramethylene glycol) and/or poly(methyltetramethylene glycol) are preferred.

It is preferable for these long-chain polyols to have a number-average molecular weight in a range of 1,500 to 5,000. By using a long-chain polyol having a number-average molecular weight within this range, golf balls made of a thermoplastic polyurethane composition having excellent properties such as rebound and manufacturability can be reliably obtained. The number-average molecular weight of the long-chain polyol is more preferably in a range of 1,700 to 4,000, and even more preferably in a range of 1,900 to 3,000.

In this specification, "number-average molecular weight of the long-chain polyol" refers to the number-average molecular weight computed based on the hydroxyl number measured in accordance with JIS K-1557.

Chain extenders suitable for use include those used in the prior art relating to thermoplastic polyurethanes. For example, low-molecular-weight compounds which have a molecular weight of not more than 400 and bear on the molecule two or more active hydrogen atoms capable of reacting with isocyanate groups are preferred. Illustrative, non-limiting, examples of the chain extender include 1,4-butylene glycol, 1,2-ethylene glycol, 1,3-butanediol, 1,6-hexanediol and 2,2-dimethyl-1,3-propanediol. Of these chain extenders, aliphatic diols having 2 to 12 carbons are preferred, and 1,4-butylene glycol is especially preferred.

Suitable organic diisocyanates include those used in the prior art relating to thermoplastic polyurethanes. Illustrative, non-limiting, examples include aromatic diisocyanates such as 4,4'-diphenylmethane diisocyanate, 2,4-toluene diisocyanate and 2,6-toluene diisocyanate; and aliphatic diisocyanates such as hexamethylene diisocyanate. Depending on the type of isocyanate used, the crosslinking reaction during injection molding may be difficult to control. In the practice of the invention, to provide a balance between stability at the time of production and the properties that are manifested, it is most preferable to use 4,4'-diphenylmethane diisocyanate, which is an aromatic diisocyanate.

It is most preferable for the thermoplastic polyurethane used in the invention to be one synthesized using a polyether polyol as the long-chain polyol, an aliphatic diol as the chain extender, and an aromatic diisocyanate as the organic diisocyanate compound, and specifically one synthesized using poly(tetramethylene glycol) having a number-average molecular weight of 1,900 as the polyether polyol, 1,4-butylene glycol as the chain extender, and 4,4'-diphenylmethane diisocyanate as the aromatic diisocyanate.

The above thermoplastic polyurethane is prepared by a polyurethane-forming reaction of an organic diisocyanate compound with a long-chain polyol and a chain extender. By setting the content of nitrogen atoms in the thermoplastic polyurethane that originate from the organic diisocyanate compound, as a percentage of the combined weight of the long-chain polyol, organic diisocyanate compound and chain extender, within a range of 4.0 to 6.5 wt %, golf balls in which the above-mentioned properties such as rebound, spin characteristics, scuff resistance and manufacturability are even better can be reliably obtained.

The ratio of active hydrogen atoms to isocyanate groups in the polyurethane-forming reaction can be set within a desirable range so as to enable golf balls made of a thermoplastic polyurethane composition that are endowed with even better properties such as rebound, spin performance, scuff resistance and manufacturability to be obtained.

No particular limitation is imposed on the method of preparing the thermoplastic polyurethane. Production may be carried out by either a prepolymer process or a one-shot process in which the long-chain polyol, chain extender and organic diisocyanate compound are used and a known urethane-forming reaction is carried out. Of these, a process in which melt polymerization is carried out in a substantially solvent-free state is preferred. Production by continuous melt polymerization using a multiple screw extruder is especially preferred.

The method of forming the cover layer on the inventive golf ball may involve, for example, feeding the above cover material to an injection molding machine and injecting the molten cover material around the core so as to form the cover layer. The molding temperature varies with the type of thermoplastic polyurethane, but is generally in a range of 150 to 250° C.

If injection molding is carried out, it is desirable, though not essential, to carry out a nitrogen purge or vacuum treatment at some or all places on the resin paths from the resin feed area to the mold interior, and to carry out molding in a low-humidity environment.

After the cover material has been molded as described above, its properties as a golf ball cover can be further improved by carrying out annealing so as to induce the crosslinking reaction to proceed even further. "Annealing," as used herein, refers to aging the cover layer in a fixed environment for a fixed length of time.

The above crosslinking reaction is believed to involve the reaction of residual isocyanate groups with residual hydroxyl groups in the thermoplastic polyurethane composition to form new urethane bonds, and addition reactions by residual isocyanate groups with the urethane groups on the thermoplastic polyurethane to form allophanate or biuret crosslinks.

The annealing temperature can be set to generally at least 40° C., preferably at least 45° C., more preferably at least 50° C., and even more preferably at least 70° C. If the temperature during annealing is too low, this step may do little to induce the crosslinking reaction to proceed. On the other hand, in cases where the cover layer is itself composed of two or more constituent layers and a portion thereof is formed of an ionomer resin, or in cases where the inventive golf ball is composed of a core, an intermediate layer enclosing the core, and a cover layer enclosing the intermediate layer, with the intermediate layer being made of an ionomer resin, if annealing is carried out at too high a temperature, the temperature may exceed the cluster melting point Ti of the ionomer resin, as a result of which the rebound of the golf ball may decrease. Also, exceeding the melting point Tm of the ionomer resin may result in deformation of the intermediate layer.

No particular limitation is imposed on the means for carrying out such annealing. Annealing may be carried out in an oven, or by installing within the manufacturing operation a heat source place and having the workpieces pass over that place. The annealing time, which may be set as appropriate for the annealing treatment temperature within a range that elicits the desired treatment effects, is generally at least 30 minutes, preferably at least 1 hour, and most preferably at least 2 hours.

At least one of the one or more cover layers on the inventive golf ball is made of the above-described thermoplastic polyurethane composition. The cover layer made of this thermoplastic polyurethane composition has a surface hardness, expressed as the durometer D hardness, of generally 30 to 90, preferably 35 to 85, more preferably 40 to 80, and even more preferably 45 to 75. If the surface hardness of the cover layer is too low, the spin rate when the ball is hit with a driver may increase, shortening the carry of the ball. On the other hand, if the surface hardness of the cover layer is too high, the feel of the ball on impact may worsen and the urethane material may have a poor resilience and durability.

"Durometer D hardness" refers herein to the hardness measured with a type D durometer in accordance with JIS K7215.

The above-described cover layer has a rebound resilience of generally at least 35%, preferably at least 40%, more preferably at least 45%, and even more preferably at least 47%. Because thermoplastic polyurethane does not inherently have that good a resilience, strict selection of the rebound resilience is preferable. If the rebound resilience of the cover layer is too low, the distance traveled by the golf ball may dramatically decrease. On the other hand, if the rebound resilience of the cover layer is too high, the initial velocity on shots of under 100 yards that require control and on putts may be too high and the feel of the ball when played may not agree with the golfer.

"Rebound resilience" refers herein to the rebound resilience obtained in accordance with JIS K7311.

The core used in the inventive golf ball is not subject to any particular limitation. For example, various cores that may be used include solid cores for two-pieces balls, solid cores having a plurality of vulcanized rubber layers, solid cores having a plurality of resin layers, and thread-wound cores having a rubber thread layer. No particular limitation is imposed on the diameter, weight, hardness, constituent materials and other characteristics of the core.

In cases where the golf ball of the invention has a construction that includes an intermediate layer, no particular limitation is imposed on the hardness, constituent materials, thickness and other characteristics of the intermediate layer. If necessary, a primer layer may be provided to improve adhesion between the intermediate layer and the cover.

It is preferable for the cover layer to have a thickness within a range of 0.1 to 5.0 mm. The cover layer is not limited to a single layer, and may be formed with a multilayer construction. If the cover is formed with a multilayer construction, the overall thickness of the cover may be set within the foregoing range.

The golf ball of the invention is preferably formed to a diameter and weight in accordance with the Rules of Golf, and is generally formed to a diameter of not less than 42.67 mm and a weight of not more than 45.93 g. The diameter is preferably from 42.67 to 42.9 mm. It is appropriate for deflection by the ball when subjected to a load of 980 N (100 kg) to be generally from 2.0 to 4.0 mm, and especially from 2.2 to 3.8 mm.

The golf ball of the invention has a high rebound, excellent spin characteristics and scuff resistance, and is recyclable in a molding operation. Moreover, it has an excellent manufacturability.

EXAMPLES

The following examples of the invention and comparative examples are provided by way of illustration and not by way of limitation.

(1) Melt Viscosity:

The melt viscosity of thermoplastic polyurethane that had been vacuum-dried under a pressure of 1,333.3 Pa (10 torr) or less at 120° C. for 1 hour was measured using a CFT-500D capillary rheometer manufactured by Shimadzu Corporation (nozzle dimensions: 1 mm diameter×10 mm length) under a load of 490.3 N (50 kgf) and at a temperature of 220° C.

Examples 1 to 5, and Comparative Examples 1 to 5

| Core Formulation: | |
|---|---|
| Polybutadiene | 100 parts by weight |
| Zinc acrylate | 24.5 parts by weight |
| Zinc oxide | 12 parts by weight |
| Dicumyl peroxide | 1 part by weight |
| Zinc salt of pentachlorothiophenol | 1 part by weight |

The core material of the above formulation was kneaded, following which it was molded and vulcanized at 155° C. for 20 minutes, thereby obtaining a 38.5 mm diameter solid core for a two-piece solid golf ball. The polybutadiene rubber used was BR01 produced by JSR Corporation. The resulting core had a specific gravity of 1.17 g/cm³, a deflection of 3.4 mm under a load of 980 N (100 kg), and an initial velocity, measured in accordance with the measurement method of the USGA (R&A), of 78.1 m/s.

The starting materials shown in Tables 1 and 2 (units: parts by weight) were worked at a temperature of 190 to 220° C. in a twin-screw extruder, thereby giving cover materials.

The solid core was placed within a mold for injection molding and the cover material was injection molded around the core, thereby giving two-piece golf balls in the respective examples of the invention and comparative examples, each having a 2.1 mm thick cover. Following injection molding of the cover material, annealing treatment was administered under the temperature conditions shown in the table. The annealing time was 120 minutes. The resulting golf ball was held at room temperature for one week, following which the ball properties were evaluated. Measurement of the physical properties of the cover was carried out on samples prepared by injection molding a 2 mm thick sheet, subjecting the molded sheet to annealing treatment in the same way as described above, and holding the annealed sheet at room temperature for one week. The recyclability and manufacturability of the cover material were also evaluated. The results are shown in Tables 1 and 2.

Polyurethane 1

Kuramiron 5D51-W21-XWF0 (produced by Kuraray Co., Ltd.): a 4,4'-diphenylmethane diisocyanate/1,4-butylene glycol/poly(tetramethylene glycol) (abbreviated below as "MDI-BD-PTMG") type thermoplastic polyurethane. Melt viscosity, 83 Pa·s. Durometer D hardness, 51. Rebound resilience, 50%. Inherent viscosity in DMF solvent of polyurethane before molding, 0.5 dl/g. Inherent viscosity in 0.05 mol/L n-butylamine-containing DMF solution of polyurethane before molding, 0.5 dl/g. Inherent viscosity in DMF solvent of polyurethane after molding, $\geqq 2.0$ dl/g. Inherent

TABLE 1

| | | | Example | | | | |
|---|---|---|---|---|---|---|---|
| | | | 1 | 2 | 3 | 4 | 5 |
| Thermoplastic polyurethane (parts by weight) | Polyurethane 1 | | 100 | | | | |
| | Polyurethane 2 | | | 100 | 100 | 100 | |
| | Polyurethane 3 | | | | | | 100 |
| Titanium oxide (pbw) | | | 3 | 3 | 3 | 3 | 3 |
| Polyethylene wax (pbw) | | | 1 | 1 | 1 | 1 | 1 |
| Annealing treatment | | Normal temperature, in air | ○ | ○ | | | ○ |
| | | 50° C. | | | ○ | | |
| | | 70° C. | | | | ○ | |
| Cover properties | Surface hardness (D hardness) | | 60 | 63 | 63 | 63 | 64 |
| | Rebound resilience (%) | | 50 | 51 | 51 | 51 | 51 |
| Cover quality | Inherent viscosity (before molding) | DMF solvent | 0.5 | 0.5 | 0.5 | 0.5 | 0.5 |
| | | DMF/amine solution | 0.5 | 0.5 | 0.5 | 0.5 | 0.5 |
| | Inherent viscosity (after molding) | DMF solvent | $\geqq 2.0$ | $\geqq 2.0$ | $\geqq 2.0$ | $\geqq 2.0$ | $\geqq 2.0$ |
| | | DMF/amine solution | 0.8 | 0.9 | 1.0 | 1.1 | 1.0 |
| Ball properties | Diameter (mm) | | 42.7 | 42.7 | 42.7 | 42.7 | 42.7 |
| | Weight (g) | | 45.6 | 45.6 | 45.6 | 45.6 | 45.6 |
| | Hardness (mm) | | 2.4 | 2.3 | 2.3 | 2.3 | 2.3 |
| | Initial velocity (m/s) | | 77.1 | 77.0 | 77.0 | 76.7 | 77.1 |
| | Scuff resistance | 23° C. | 4 | 4 | 5 | 5 | 4 |
| | | 13° C. | 4 | 4 | 4 | 5 | 4 |
| | | 0° C. | 4 | 3 | 4 | 4 | 3 |
| Recyclability | | | yes | yes | yes | yes | yes |
| Manufacturability | | | good | good | good | good | good |

TABLE 2

| | | | Comparative Example | | | | |
|---|---|---|---|---|---|---|---|
| | | | 1 | 2 | 3 | 4 | 5 |
| Thermoplastic polyurethane (parts by weight) | Polyurethane 4 | | 50 | 50 | 50 | 100 | 0 |
| | Polyurethane 5 | | 50 | 50 | 50 | 0 | 100 |
| Titanium oxide (pbw) | | | 3 | 3 | 3 | 3 | 3 |
| Polyethylene wax (pbw) | | | 1 | 1 | 1 | 1 | 1 |
| Isocyanate (pbw) | | | 20 | 20 | 20 | 0 | 0 |
| Annealing treatment | | Normal temperature, in air | ○ | | | ○ | ○ |
| | | 50° C. | | ○ | | | |
| | | 70° C. | | | ○ | | |
| Cover properties | Surface hardness (D hardness) | | 62 | 62 | 62 | 62 | 62 |
| | Rebound resilience (%) | | 45 | 45 | 45 | 44 | 46 |
| Cover quality | Inherent viscosity (before molding) | DMF solvent | 0.6 | 0.6 | 0.6 | 0.6 | 0.6 |
| | | DMF/amine solution | 0.6 | 0.6 | 0.6 | 0.6 | 0.6 |
| | Inherent viscosity (after molding) | DMF solvent | $\geqq 2.0$ | $\geqq 2.0$ | $\geqq 2.0$ | 0.6 | 0.6 |
| | | DMF/amine solution | 0.8 | 0.8 | 0.9 | 0.6 | 0.6 |
| Ball properties | Diameter (mm) | | 42.7 | 42.7 | 42.7 | 42.7 | 42.7 |
| | Weight (g) | | 45.7 | 45.7 | 45.7 | 45.7 | 45.7 |
| | Hardness (mm) | | 2.3 | 2.3 | 2.3 | 2.4 | 2.3 |
| | Initial velocity (m/s) | | 77.1 | 77.1 | 76.8 | 77.0 | 77.1 |
| | Scuff resistance | 23° C. | 4 | 4 | 5 | 2 | 2 |
| | | 13° C. | 4 | 4 | 4 | 2 | 2 |
| | | 0° C. | 3 | 3 | 4 | 1 | 1 |
| Recyclability | | | yes | yes | yes | yes | yes |
| Manufacturability | | | NG | NG | NG | good | good | viscosity in 0.05 mol/L n-butylamine-containing DMF solution of polyurethane after molding, 0.8 dl/g.

Polyurethane 2

Kuramiron 5D54-W21-XWF1 (produced by Kuraray Co., Ltd.): a MDI-BD-PTMG type thermoplastic polyurethane. Melt viscosity, 75 Pa·s. Durometer D hardness, 54. Rebound resilience, 51%. Inherent viscosity in DMF solvent of polyurethane before molding, 0.5 dl/g. Inherent viscosity in 0.05 mol/L n-butylamine-containing DMF solution of polyurethane before molding, 0.5 dl/g. Inherent viscosity in DMF solvent of polyurethane after molding, $\geq$2.0 dl/g. Inherent viscosity in 0.05 mol/L n-butylamine-containing DMF solution of polyurethane after molding, 0.9 dl/g.

Polyurethane 3

Kuramiron 5D54-W21-FWX3 (produced by Kuraray Co., Ltd.): a MDI-BD-PTMG type thermoplastic polyurethane. Melt viscosity, 40 Pa·s. Durometer D hardness, 54. Rebound resilience, 51%. Inherent viscosity in DMF solvent of polyurethane before molding, 0.5 dl/g. Inherent viscosity in 0.05 mol/L n-butylamine-containing DMF solution of polyurethane before molding, 0.5 dl/g. Inherent viscosity in DMF solvent of polyurethane after molding, $\geq$2.0 dl/g. Inherent viscosity in 0.05 mol/L n-butylamine-containing DMF solution of polyurethane after molding, 1.0 dl/g.

Polyurethane 4

Pandex T8295 (produced by DIC Bayer Polymer, Ltd.): a MDI-PTMG type thermoplastic polyurethane. JIS-A hardness, 97. Rebound resilience, 44%. Inherent viscosity in DMF solvent of polyurethane before and after molding, 0.6 dl/g. Inherent viscosity in 0.05 mol/L n-butylamine-containing DMF solution of polyurethane before and after molding, 0.6 dl/g.

Polyurethane 5

Pandex T8260 (produced by DIC Bayer Polymer, Ltd.): a MDI-PTMG type thermoplastic polyurethane. Durometer D hardness, 56. Rebound resilience, 46%. Inherent viscosity in DMF solvent of polyurethane before and after molding, 0.6 dl/g. Inherent viscosity in 0.05 mol/L n-butylamine-containing DMF solution of polyurethane before and after molding, 0.6 dl/g.

Polyethylene Wax

Sanwax 161P (produced by Sanyo Chemical Industries, Ltd.)

Isocyanate

Crossnate EM-30 (an isocyanate master batch produced by Dainichi Seika Colour & Chemicals Mfg. Co., Ltd.)

[Cover Properties]

Surface Hardness

The durometer D hardness was measured in accordance with JIS-K7215.

Inherent Viscosity of Thermoplastic Polyurethane in DMF Solvent

The thermoplastic polyurethane was dissolved in DMF to a concentration of 0.5 g/dl, the flow time at 30° C. of the polyurethane solution was measured using an Ubbelohde viscometer, and the inherent viscosity ($\eta_{inh}$) of the thermoplastic polyurethane was determined from the following formula.

$$\text{Inherent viscosity } (\eta_{inh}) \text{ of thermoplastic polyurethane} = [\ln(t/t_0)]/c$$

In the formula, the letter t represents the flow time (in seconds) for the DMF solvent of thermoplastic polyurethane, $t_0$ is the flow time (s) of the solvent (DMF), and c is the concentration (g/dl) of the thermoplastic polyurethane in the DMF solvent.

Here, when the thermoplastic polyurethane was insoluble in the DMF solvent, the inherent viscosity was indicated as $\geq$2.0.

For the thermoplastic polyurethane within a thermoplastic polyurethane composition, the inherent viscosity of the thermoplastic polyurethane obtained by extraction as described below was measured.

N,N-Dimethylformamide (DMF) was added to the thermoplastic polyurethane composition in a proportion of 40 ml per 0.2 g of the composition and stirred at room temperature for 24 hours, following which it was separated off by filtration, thereby recovering a DMF solvent. The flow time of the recovered DMF solvent was measured using an Ubbelohde viscometer in the same way as above. Next, 5 ml of the DMF solvent was taken from the recovered DMF solvent with a 5 ml transfer pipette, placed as a sample in a precisely weighed crucible, and the DMF was removed by distillation at 120° C., leaving the thermoplastic polyurethane. The weight of the thermoplastic polyurethane component was then measured and the concentration c (g/dl) of thermoplastic polyurethane component present in the thermoplastic polyurethane composition was determined.

Inherent Viscosity of Thermoplastic Polyurethane in 0.05 mol/L n-Butylamine-Containing DMF Solution The thermoplastic polyurethane was dissolved in 0.05 mol/L n-butylamine-containing DMF to a concentration of 0.5 g/dl, the flow time at 30° C. of the polyurethane solution was measured using an Ubbelohde viscometer, and the inherent viscosity ($\eta_{inh-a}$) of the thermoplastic polyurethane was determined from the following formula.

$$\text{Inherent viscosity } (\eta_{inh-a}) \text{ of thermoplastic polyurethane} = [\ln(t/t_0)]/c$$

In the formula, the letter t represents the flow time (in seconds) for the 0.05 mol/L n-butylamine-containing DMF solution of thermoplastic polyurethane, $t_0$ is the flow time (s) of the solvent (0.05 mol/L n-butylamine-containing DMF), and c is the concentration (g/dl) of the thermoplastic polyurethane in the 0.05 mol/L n-butylamine-containing DMF solution.

For the thermoplastic polyurethane within a thermoplastic polyurethane composition, the inherent viscosity of the thermoplastic polyurethane obtained by extraction as described below was measured.

N,N-Dimethylformamide (DMF) containing 0.05 mol/L of n-butylamine was added to the thermoplastic polyurethane composition in a proportion of 40 ml per 0.2 g of the composition and stirred at room temperature for 24 hours, following which it was separated off by filtration, thereby recovering a 0.05 mol/L n-butylamine-containing DMF solution. The flow time of the recovered 0.05 mol/L n-butylamine-containing DMF solution was measured using an Ubbelohde viscometer in the same way as above. Next, 5 ml of the 0.05 mol/L n-butylamine-containing DMF solution was taken from the recovered DMF solution with a 5 ml transfer pipette, placed as a sample in a precisely weighed crucible, and the 0.05 mol/L n-butylamine-containing DMF solution was removed by distillation at 120° C., leaving the thermoplastic polyurethane. The weight of the thermoplastic polyurethane component was then measured and the concentration c (g/dl) of thermoplastic polyurethane component present in the thermoplastic polyurethane composition was determined.

Rebound Resilience

The rebound resilience was measured in accordance with JIS-K7311.

[Ball Properties]

Hardness (mm)

The deflection when subjected to a load of 980 N (100 kg) was measured.

Initial Velocity (m/s)

Measured in accordance with the measurement method of the USGA (R&A)

Scuff Resistance

The ball was held at respective temperatures of 23° C., 13° C. and 0° C. Using a swing robot machine, each ball was hit, using a pitching wedge as the club, at a head speed of 33 m/s, after which damage from the impact was visually rated according to the following criteria.

5: No damage whatsoever or substantially free of apparent damage.
4: Slight damage is apparent, but of minimal concern.
3: Surface is somewhat frayed.
2: Surface is frayed and damaged dimples are apparent.
1: Some dimples are completely obliterated.

Recyclability

The runners that form during injection molding were milled and evaluated for reusability. Here, "runners" refers to excess resin that has solidified in the mold channels for uniformly feeding molten resin during injection molding. In the production of molded articles made of thermoplastic resin, these runners are generally pulverized, mixed with the resin and reused.

Yes: Problems such as eccentricity did not arise even when up to 50% of pulverized runner resin was mixed into virgin resin and molded.
No: The runner resin gelled and failed to melt when heated, and thus could not be reused in molding.

Manufacturability

Good: Molding conditions during mass production were stable; problems such as scorching of resin were infrequent.
NG: Molding conditions during mass production were unstable; high frequency of problems such as resin scorching.

The invention claimed is:

1. A golf ball comprising a core and one or more cover layer which encloses the core, wherein at least one cover layer is made of a thermoplastic polyurethane composition characterized by including at least 90 wt % of a thermoplastic polyurethane obtained by a polyurethane-forming reaction of an organic diisocyanate compound with a long-chain polyol and a chain extender, and wherein the thermoplastic polyurethane contained in the cover layer is characterized in that an inherent viscosity in a DMF solvent is larger than 1.5 dl/g and an inherent viscosity in a DMF solution containing 0.05 mol/L n-butylamine is larger than 0.5 dl/g, and the inherent viscosity in DMF is larger than the inherent viscosity in DMF of the thermoplastic polyurethane prior to molding, and the inherent viscosity in 0.05 mol/L n-butylamine-containing DMF solution is larger than the inherent viscosity in 0.05 mol/L n-butylamine-containing DMF solution of the thermoplastic polyurethane prior to molding, and the thermoplastic polyurethane making up the cover layer has a content of nitrogen atoms originating from the organic diisocyanate compound, expressed as a percentage of the weight of the long-chain polyol, the organic diisocyanate compound and the chain extender combined, within a range of 4.0 to 6.5 wt %.

2. The golf ball of claim 1 which is characterized in that the long-chain polyol is a polyether polyol having a number-average molecular weight of 1,500 to 5,000.

3. The golf ball of claim 1, wherein the cover layer has a thickness within a range of 2.1 to 5.0 mm.

4. The golf ball of claim 1, wherein the cover layer has a rebound resilience of at least 35%.

5. The golf ball of claim 1, wherein the cover layer made of the thermoplastic polyurethane composition has a surface hardness, expressed as the durometer D hardness, of 40 to 80 and has a rebound resilience of at least 45%.

6. The golf ball of claim 1, wherein the cover layer made of the thermoplastic polyurethane composition is formed by covering the core with the thermoplastic polyurethane composition, then heat treating at a temperature of at least 50° C.

7. The golf ball of claim 1, wherein the thermoplastic polyurethane composition is recyclable in a molding operation.

8. The golf ball of claim 1, wherein the inherent viscosity of the thermoplastic polyurethane in a DMF solvent is at least 1.7 dl/g.

9. The golf ball of claim 1, wherein the inherent viscosity of the thermoplastic polyurethane in a 0.05 mol/L n-butylamine-containing DMF solution is at least 0.6 dl/g.

10. The golf ball of claim 1, wherein the long-chain polyol is at least one compound selected from the group consisting of polyester polyols, polyether polyols, polycarbonate polyols, polyester polycarbonate polyols, polyolefin polyols, conjugated diene polymer-based polyols, castor oil-based polyols, silicone-based polyols and vinyl polymer-based polyols.

11. The golf ball of claim 1, wherein the chain extender is at least one compound selected from the group consisting of 1,4-butylene glycol, 1,2-ethylene glycol, 1,3-butanediol, 1,6-hexanediol and 2,2-dimethyl-1,3-propanediol.

12. The golf ball of claim 1, wherein after the cover material has been molded, the cover layer is carried out by annealing for at least 30 minutes.

* * * * *